(12) United States Patent
Kobayashi et al.

(10) Patent No.: US 6,561,531 B2
(45) Date of Patent: May 13, 2003

(54) STRUT MOUNT STRUCTURE (75) Inventors: Yoshimitsu Kobayashi, Tokyo (JP); Toshiyuki Matsuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,912

(22) Filed: Oct. 11, 2001

(65) Prior Publication Data
US 2002/0041075 A1 Apr. 11, 2002

(30) Foreign Application Priority Data
Oct. 11, 2000 (JP) ........................................ 2000-310980

(51) Int. Cl.[7] .......................... B60G 13/06; B60G 15/07
(52) U.S. Cl. ............................ 280/124.155; 267/220; 267/221
(58) Field of Search ................... 280/124.147, 124.155; 267/220, 221

(56) References Cited

U.S. PATENT DOCUMENTS

| 4,084,837 A | * | 4/1978 | Milner | 280/124.147 |
| 4,200,307 A | * | 4/1980 | Szabo | 280/124.155 |
| 4,290,626 A | * | 9/1981 | Sullivan, Jr. et al. | 280/124.155 |
| 4,721,325 A | * | 1/1988 | Mackovjak et al. | 280/124.147 |

FOREIGN PATENT DOCUMENTS

JP 7-266821 * 10/1995

* cited by examiner

*Primary Examiner*—Peter C. English
(74) *Attorney, Agent, or Firm*—Smith, Gambrell & Russell, LLP (57) ABSTRACT

A strut mount structure for a vehicle for supporting a strut of a strut-type suspension is disclosed. Since the strut mount structure does not have any protruded portions with respect to a front hood while maintaining equal distance between the strut mount unit and the front hood, it is possible to freely choose the design of the front hood. Furthermore, the strut mount structure with a satisfactory large distance between the strut mount unit and the front hood absorbs impact well when a pedestrian comes into contact with the vehicle on the front hood.

14 Claims, 6 Drawing Sheets

PRIOR ART

PRIOR ART
FIG. 6

STRUT MOUNT STRUCTURE

BACKGROUND OF THE INVENTION

1. Field of the Invention

The present invention relates to a strut mount structure of a strut-type suspension for a vehicle body.

2. Discussion of the Related Art

A strut-type suspension is widely used as a suspension for a vehicle body. Such a structure is used because it is simple; that is, the wheel alignment can be accurately set because the point where the strut is fixed to the body is high and the deviation of the wheel alignment is small. Therefore, shock from a road to the body can be widely dispersed over the body, and the suspension can be light-weight since the number of members is small.

Figure 5:
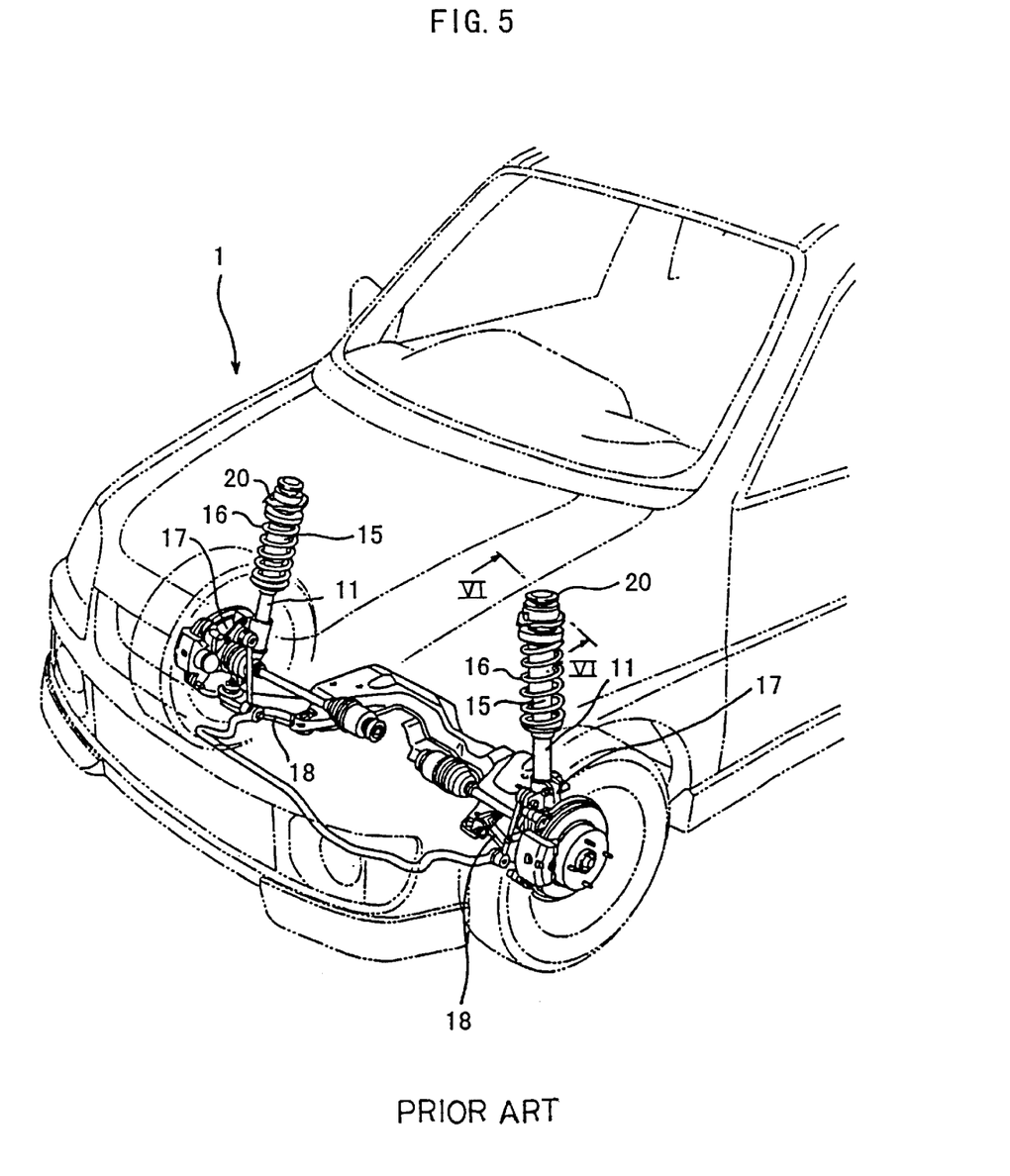
FIG. 5 is a perspective diagram of a front part of a vehicle for explaining a conventional strut mount structure.

FIG. 5 shows a perspective diagram of a front part of a body 1. Here, a strut 11 which is vertically installed contains a shock absorber 15 and a coil spring 16 around the shock absorber 15. A top end of the strut 11 is fixed to and supported by the body, and a bottom end of the strut 11 is supported by the body via a lower arm 18, with a knuckle arm 17 for supporting a wheel fixed to the bottom end.

In order to secure steering stability, the strut 11 is provided with a caster angle with the top end inclined in the rear direction with respect to the bottom end when seen from the side of the vehicle, and with a strut inclination angle by the top end inclined in the inner direction of the vehicle with respect to the bottom end when seen from the front.

Figure 6:
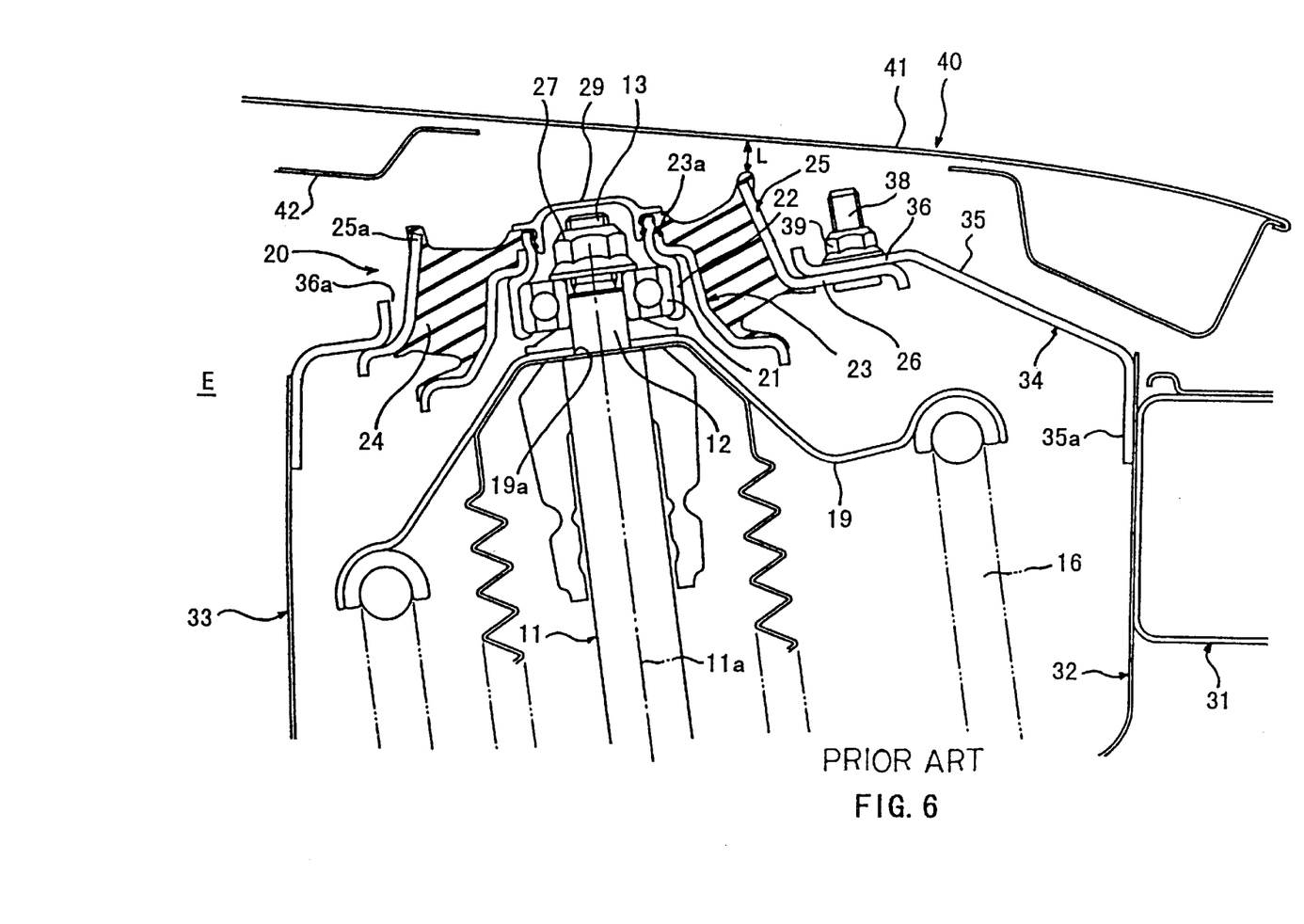
FIG. 6 is an enlarged cross-section of FIG. 5 seen from a part cut along a line VI—VI.

As shown in FIG. 6 which is an enlarged cross-section along a line VI—VI of FIG. 5, an upper part of the strut 11 is fixed to and supported by the main body via a strut mount unit 20. The upper part of the strut 11 has an installation hole 19a provided on a spring sheet 19 which supports a top end of a coil spring 16 and a small diameter portion 12 which fits in the installation hole 19a, forming a step. Further, a screw part 13 is formed on the top of the small diameter portion 12.

The strut mount unit 20 has a bearing housing 22 approximately in the shape of a cylinder having an upper part thereof with a smaller diameter. The bearing housing 22 holds a bearing 21 at a lower part thereof and fits with the small diameter portion 12 of the strut 11. An inner fitting 23 approximately in a cylindrical shape with the diameter gradually increasing in a downward direction has a top end caulked with the upper part of the bearing housing 22. An outer fitting 25 approximately in the shape of a cylinder has a flange 26 at the lower part. The outer fitting 25 is connected to the inner fitting 23 by a rubber portion 24 therebetween.

The strut 11 and the strut mount unit 20 are thus connected in one united body by fitting the small diameter portion 12 into the installation hole 19a provided on the spring sheet 19, inserting the small diameter portion 12 into the bearing 21, and then screwing a nut 27 on the screw part 13.

On the other hand, the top end of the strut 11 is supported by the main body at the strut mount unit 20 on a wheel apron 32, a strut tower 33, and an upper bracket 34. The wheel apron 32 forms a lateral wall of an engine room E connected with an upper frame 31 which extends in the front-to-back direction along the lateral wall. The strut tower 33 extends downward vertically between the engine room E and a part on the wheel apron 32. The upper bracket 34 is provided across the upper part of the strut tower 33 and the upper part of the wheel apron 32.

The upper bracket 34 has a strut installation hole 36a as an opening to which the upper part of the outer fitting 25 is inserted. The upper bracket 34 also has a planer portion 35. By inserting the outer fitting 25 to the strut installation hole 36a, a flange 26 of the outer fitting 25 is in contact with the lower surface of a strut mount installation portion 36. There is a connection flange part 35a in a bent form, which is contiguous with the planer part 35 and is connected to upper parts of the wheel apron 32 and the strut tower 33.

The flange 26 is brought into contact with the strut mount installation portion 36 at the lower surface thereof by insertion of the upper part of the outer fitting 25 into the strut installation hole 36a. The overlaid strut mount installation portion 36 and the flange 26 are fixed together by a bolt 38 and a nut 39, whereby the top end of the strut 11 is fixed to the main body via the strut mount unit 20. In FIG. 6, a cap 29 is provided fitting with the top of the bearing housing 22 for preventing dust and water drops from intruding into the bearing housing 22.

The front hood 40 shown in the figure covers the top of the engine room E, and is composed of an outer panel 41 and an inner panel 42 extending below the outer panel 41. The front hood 40 is fixed to and supported by the main body by front hood hinges (not shown) at the rear edge. The outer panel 41 is smoothly and continuously bent so that the outer edges thereof in the width direction are lower, and declined towards the front. The inner panel 42 is cut out at a part corresponding to the location of the strut mount unit 20. The inner panel 42, together with the outer panel 41, form a frame structure having continuous hollow cross-sections created by downwardly projected portions of the inner panel 42 as shown.

The strut mount unit 20 has a top face defined by top edges 23a and 25a of the inner fitting 23 and the outer fitting 25. The cross-section of the top face, that corresponds to a line defined by the top edges 23a and 25a when viewed from the side, crosses a central axis 11a making a right angle. The strut 11 is provided with a strut inclination angle with the top end inclined in the inner direction of the vehicle with respect to the bottom end when seen from the front, and with a caster angle (not shown) by the top end inclined in the rear direction with respect to the bottom end when seen from the side of the vehicle, in order to secure steering stability. Because of the inclination of the strut 11, the top edges 23a and 25a are inclined to have the outer edge higher than the inner edges in the car-width direction and the edges toward the front side of the vehicle are higher than the edges facing the rear of the vehicle. The planer part 35 of the upper bracket 34 is inclined to have the strut mount installation portion 36 correspond to the inclination of the strut mount unit 20. Namely, the outer side of the strut mount installation portion 36 is higher than the inner side thereof, and the front side is higher than the rear side. On the other hand, the front hood 40 is bent to have lower outer sides and a lower front side as mentioned previously. By the interaction between the inclinations of the strut mount unit 20 and the front hood 40, the minimum gap L that can be formed between the top edge of the strut mount unit 20 and a lower face of the front hood 40 is restricted.

Owing to the necessity to maintain the minimum gap L between the strut mount unit 20 and the front hood 40 satisfactorily, the shape of the front hood 40 is restricted. Hence, the restricted shape of the front hood 40 may affect the structural design freedom. Moreover, when a pedestrian comes into contact with the vehicle on the front hood 40 with a restricted deformable distance between the front hood 40 and the strut mount unit 20, there is the possibility that impact absorption effect by the deformation of the front hood 40 would not be satisfactory. Furthermore, if the strut mount unit 20 is placed at a low position to have the minimum gap L large, the effective length of the strut 11 is shortened. In this case, it would not be possible to provide as comfortable a ride.

OBJECT AND SUMMARY OF THE INVENTION

It is therefore an object of the present invention to provide a strut mount structure wherein a minimum gap between a strut mount unit and a lower face of a front hood can be made larger in comparison to a corresponding minimum gap in a conventional strut mount structure. As a result, the shape of the front hood can be freely selected and the structural design freedom is increased. In addition, safety to a pedestrian is improved by the satisfactory deformation capability of the front hood which absorbs impact as a result of the larger minimum gap, for instance, when the pedestrian contacts with the front hood from the top.

The object of the present invention is achieved by a strut mount structure for supporting a strut to be installed in a strut tower in a vehicle body, comprising an upper bracket provided on a top of the strut tower, the upper bracket having a strut installation hole and a strut mount installation portion provided to surround the strut installation hole; and a strut mount unit having an inner fitting approximately in a cylinder shape with an inner fitting top edge, the inner fitting supporting a top end of the strut; approximately in a cylinder shape with an outer fitting top edge, and a flange connected to the strut mount installation portion by a top part of the outer fitting inserted into the strut installation hole from the back of the upper bracket; a rubber portion with a rubber top face interposed between the inner fitting and the outer fitting for connecting the inner fitting and the outer fitting together, wherein an imaginary plane defined on the outer fitting top edge and a central axis of the strut cross each other so as to define a first angle as an inner angle when viewed from the front of the vehicle body and a second angle as a front angle when viewed from the side of the vehicle body, the first angle being an obtuse angle and the second angle being an acute angle.

The object of the present invention is also achieved by a strut mount structure for supporting a strut to be installed in a strut tower in a vehicle body, comprising an upper bracket provided on top of the strut tower, the upper bracket having a strut installation hole and a strut mount installation portion provided to surround the strut installation hole; and a strut mount unit having an inner fitting approximately in a cylinder shape with an inner fitting top edge, the inner fitting supporting a top end of the strut; an outer fitting approximately in a cylinder shape with an outer fitting top edge, and a flange connected to the strut mount installation portion by a top portion of the outer fitting being inserted into the strut installation hole from the back of the upper bracket; a rubber portion with a rubber top face, interposed between the inner fitting and the outer fitting for connecting the inner fitting and the outer fitting for connecting the inner fitting and the outer fitting together, wherein the outer fitting is fixed so as to maintain an almost equal distance from any portion of the outer fitting top edge to a lower face of a front hood of the vehicle body.

The object of the present invention is also achieved by a strut mount structure for supporting a strut to be installed in a strut tower in a vehicle body, comprising an upper bracket provided on a top of the strut tower, the upper bracket having a strut installation hole and a strut mount installation portion provided to surround the strut installation hole; and a strut mount unit having an inner fitting approximately in a cylinder shape with an inner fitting top edge, the inner fitting supporting a top end of the strut; an outer fitting approximately in a cylinder shape with an outer fitting top edge, and a flange connected to the strut mount installation portion by a top portion of the outer fitting being inserted into the strut installation hole from the back of the upper bracket; a rubber portion with a rubber top face, interposed between the inner fitting and the outer fitting for connecting the inner fitting and the outer fitting together, wherein the outer fitting top edge is inclined to have an outer side lower than an inner side of the vehicle body in a car-width direction and a front side lower than a rear side of the vehicle body in a car front-to-back direction.

Another object of the present invention is to provide the above-mentioned strut mount structure which provides further improved safety to a pedestrian even when the front hood is largely deformed when the lower face thereof is depressed to be in contact with the outer fitting top edge as a result of impact with a pedestrian locally on a part of the vehicle body, wherein the inner-fitting top edge, the outer fitting top edge and the rubber top face approximately form a single planer upper face of the strut mount unit.

A further object of the present invention is to provide the above-mentioned strut mount structure wherein automatic installation of the strut mount unit is easily carried out by a bolt runner which is effectively used in common for fastening at least one bolt which is vertically provided on a horizontal surface, wherein the flange further comprises an installation bolt which has been fixed thereto at a bolt installation portion, the strut installation portion further comprises a bolt hole perforated therein, the installation bolt inserted to the bolt hole from the back of the strut installation portion, a part of the bolt upwardly protruded from the bolt hole being connected with a nut so that the outer fitting is combined to the upper bracket, each of the bolt installation portion and the bolt hole formation portion is horizontally provided, and the installation bolt extends in a vertical direction.

Still another object of the present invention is to provide the above-mentioned strut mount structure which effectively prevents entrance of water drops, muddy water or the like scattered by wheels to an engine room without the use of an additional member, wherein the rubber portion comprises a sealing portion in one united body which seals a gap between an outer periphery of the flange and a lower face of the upper bracket.

BRIEF DESCRIPTION OF THE DRAWINGS

A more complete appreciation of the invention and many of the attendant other advantages of the invention will become better understood by reference to the following detailed description when considered in connection with the accompanying drawings, wherein.

DETAILED DESCRIPTION OF THE INVENTION

Other feature of this invention will become understood in the course of the following description of exemplary embodiments, which are given for illustration of the invention and are not intended to be limiting thereof.

(First Embodiment)

A first embodiment of the strut mount structure according to the present invention will now be explained by referring to FIG. 1 as a cross-section of an essential part. Detailed explanation on some members shown in FIG. 1 is omitted by using the same reference numerals thereto as the corresponding members in FIG. 6, and members or parts different from those in FIG. 6 are to be mainly explained.

Figure 1:
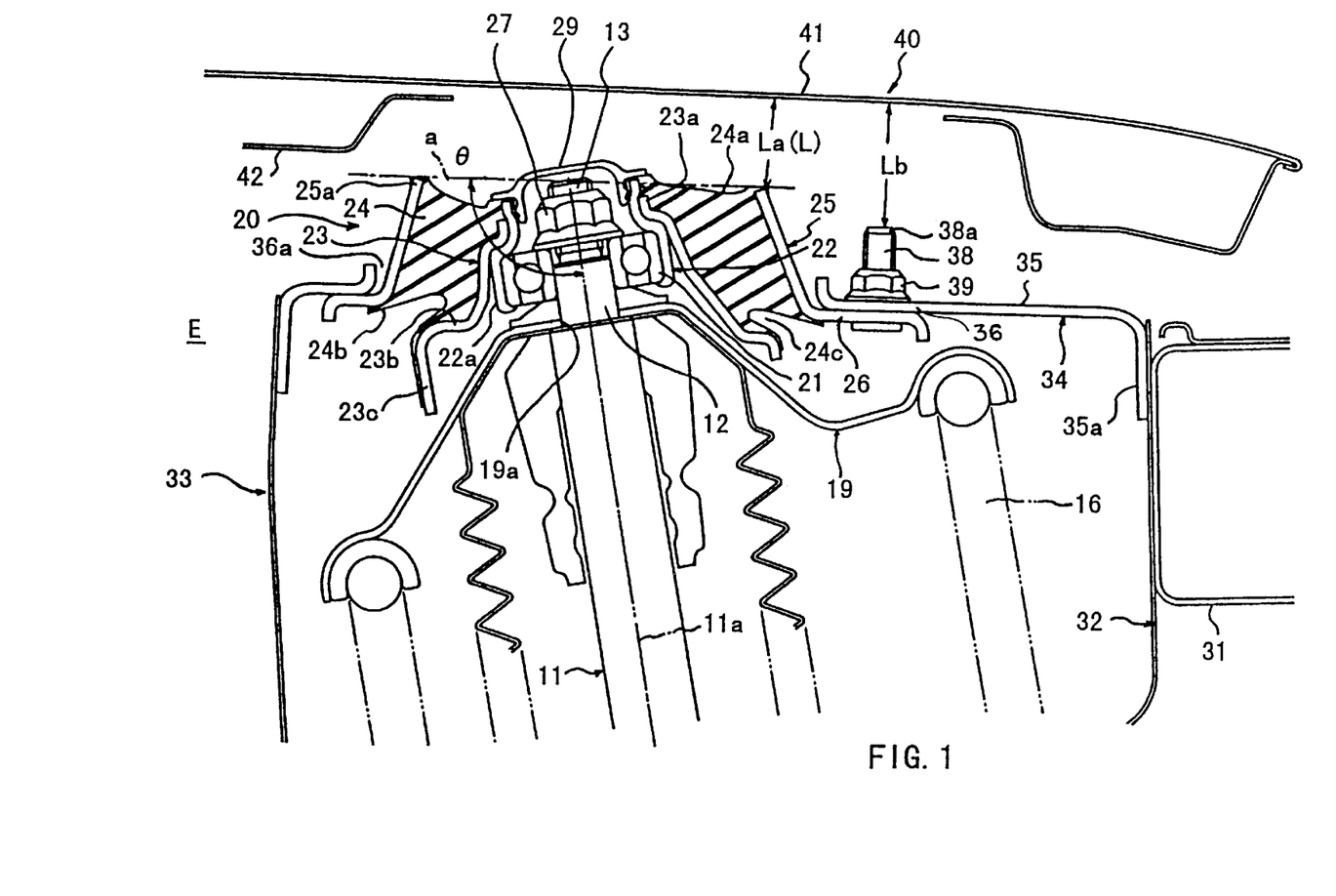
FIG. 1 is an essential cross-section of a strut mount structure for explaining the strut mount structure as a first embodiment according to the present invention.

In FIG. 1, a strut 11 is provided with a strut inclination angle by the top end inclined in the inner direction of the vehicle with respect to the bottom end when seen from the front, and with a caster angle (not shown) by the top end inclined in the rear direction with respect to the bottom end when seen from the side of the body in order to secure steering stability. An outer fitting 25 of a strut mount unit 20 is fixed to a strut mount installation portion 36. The strut mount installation portion 36 is in the form of a plate which extends opposite to the lower face of the front hood 40 in parallel therewith.

The strut mount unit 20 is composed of a bearing housing 22 for containing a bearing 21 which fits with a small diameter portion 12 of the strut 11; an inner fitting 23 having a top edge caulked with an upper part of a bearing housing 22; an outer fitting 25; and a rubber portion 24 which connects to the inner and outer fittings 23 and 25 via a vulcanization connection therebetween.

The bearing housing 22 is formed approximately in the shape of a cylinder with a bearing container part 22a at the lower part of the housing 22. The bearing container part 22a has a larger diameter for containing the bearing 21 having a step from the upper part thereof. The inner fitting 23 has a top edge caulked to the upper part of the bearing housing 22 and an annular flange 23c at a lower edge forming a step 23b, with the diameter being increased toward the lower edge. The step 23b and the flange 23 are respectively determined to have approximately cylindrical shapes with asymmetrical deformation about a central axis 11a of a strut 11. These members are determined to have the inner side larger than the outer side, with respect to the body.

The outer fitting 25 is approximately in the shape of a cylinder, which increases in diameter in the lower direction, so that the upper part of the outer fitting 25 can be inserted to a strut installation hole 36a from the back. A top edge 25a of the outer fitting 25 is placed similarly to a location which is obtained by rotating the top edge of the aforementioned conventional outer fitting 25 almost horizontally on an approximately central point of a bearing which is a support center of the strut 11. The outer fitting 25 has the top edge 25a almost at the same height as that of the top edge 23a of the inner fitting 23. The outer fitting 25 is inclined in such a manner that an inner angle θ as shown in FIG. 1 is formed as an obtuse angle, which is defined by an imaginary plane (a) on the top edge 25a and the central axis 11a of the strut 11 at the inner side of the body, and that a front angle (not shown) is formed as an acute angle, which is likewise formed by the imaginary plane (a) and the central axis 11a seen from the side of the vehicle in the front-to-back direction. Thus, the top edge 25a of the outer fitting 25 is inclined with respect to the central axis 11a of the strut 11. In this embodiment, the top edge 25a is determined to be approximately parallel with the opposing lower face of the front hood 40, with a distance La therebetween.

Furthermore, a flange 26 in the form of a disk is formed on the bottom end of the outer fitting 25 and is overlaid with the strut mount installation portion 36. A plurality of bolts 38, for example, three bolts 38 in this embodiment are fixed to the flange 26 protruded in the upper direction. The bolts 38 are inserted to bolt holes (not shown) perforated in the strut mount installation portion 36, and fastened to the strut mount installation portion 36 with nuts 39 by screwing the nuts to the bolts 38.

The rubber portion 24 in the form of a ring is interposed between the inner fitting 23 and the outer fitting 25 so as to have a top edge 24a formed approximately in a plane which is almost at the same height as the top edges 23a and 25a of the inner and outer fittings 23 and 25. A bottom edge 24b of the rubber portion 24 has an inner-lower periphery located nearby the outer-lower edge of the flange 23c of the inner fitting 23, and an outer-lower periphery located nearby the flange 26 of the outer fitting 25. In addition, the rubber portion 24 is formed having a concave pail 24c which inclines and extends from a part on the bottom edge 24b by the outer fitting 26 to a part in the upper-inner direction of the inner fitting 23. This concave part 24c is formed for adjusting spring or elastic properties of the rubber portion 24. The concave part 24c can be prepared by using a lower part of a mold employed for vulcanization composed of a plurality of sections divided in the radial direction, each of which can be detached along the inclination of the molded product.

By the thus configured strut mount unit 20, the upper edge 25a of the outer fitting 25 is almost at the same height as the upper edge 23a of the inner fitting 23 at the entire periphery. In other words, a distance La from the upper edge 25a to the lower face of the front hood 40 is set approximately uniform at any part therebetween. Moreover, the upper edge 24a of the rubber portion 24 is made flat to maintain the height almost equally to the height of the top edges 23a and 25a. Thus, in the present invention, it is possible to satisfactorily maintain the minimum gap L between the lower face of the front hood 40 and the strut mount unit 20.

Accordingly, the height of the front hood 40 can be made lower without being affected by the existence of the strut mount unit 20, and the shape and the manner of construction of the front hood 40 is increased.

Moreover, even when a pedestrian is in contact with the vehicle provided with the satisfactory minimum gap L from the top of the front hood 40, it is possible that the front hood 40 absorbs the impact deformation of the front hood 40 without being hindered by the strut mount unit 20. Namely, in the present invention, safety to pedestrians is improved by maintaining the satisfactory deformation capability of the front hood 40 which absorbs the impact, by deformation.

As mentioned previously, the upper edge of the strut mount unit 20 can be made flat by the almost horizontal provision of the upper edges 23a, 25a and 24a of the inner and outer fittings 23, 25 and the rubber portion 24. If the front hood 40 is largely deformed by contact of a pedestrian to the degree that the lower face of the front hood 40 is brought into contact with the upper face of the strut mount unit 20, the pedestrian is effectively received by the entire upper surface of the strut mount unit 20, whereby the impact which would have been applied to the pedestrian locally on a part of the body is absorbed. Accordingly, the strut mount structure is also effective from the view-point of safety to pedestrians.

In addition to the above, the shape of the front hood 40 can be freely selected and the structural design freedom is increased with maintaining the above-mentioned safety to the pedestrians. This is because a distance Lb from the top 38a of the bolt 38 for fastening the strut mount unit 20 to the lower face of the front hood 40 opposing thereto can be sufficiently obtained by the parallel provision of a planer part 35 of the upper bracket 40 with the front hood 40.

In this embodiment, the point to support the strut 11 with respect to the strut mount unit 20 is set almost at the same height as that for a conventional strut mount unit. Therefore, it is possible to maintain the effective length of the strut 11 to be the same as a conventional one, thereby maintaining comfortable ride in the vehicle.

Figure 2:
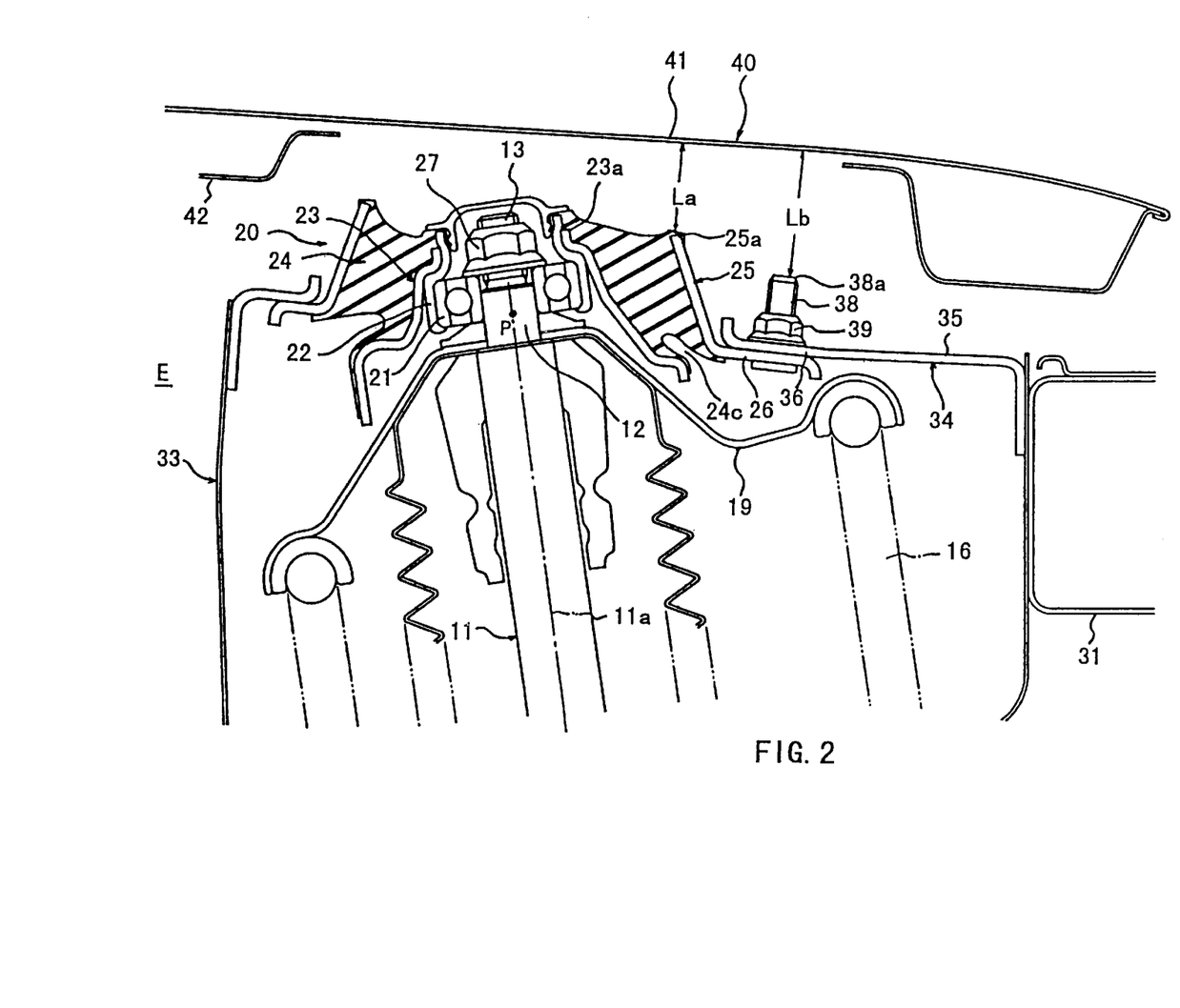
FIG. 2 is the essential cross-section of the strut mount structure of a modification of the first embodiment.

In the above explanation, the planer part 35 of the upper bracket 34 is provided so as to be in parallel with the lower face of the front hood 40. However, it is also possible, as shown in FIG. 2, that the upper face is positively inclined with the inner side of the strut mount installation portion 36 being higher than the outer side thereof, with maintaining the support point P for supporting the strut 11 to be substantially equal to the case of FIG. 1. In this way, it is possible to positively increase the gap La between the upper edge 25a of the outer fitting 25 at the outer side of the vehicle and the lower face of the front hood 40, and a gap Lb between the top 38a of the bolt 38 located at the outer side of the vehicle and the lower face of the front hood 40.

Figure 3:
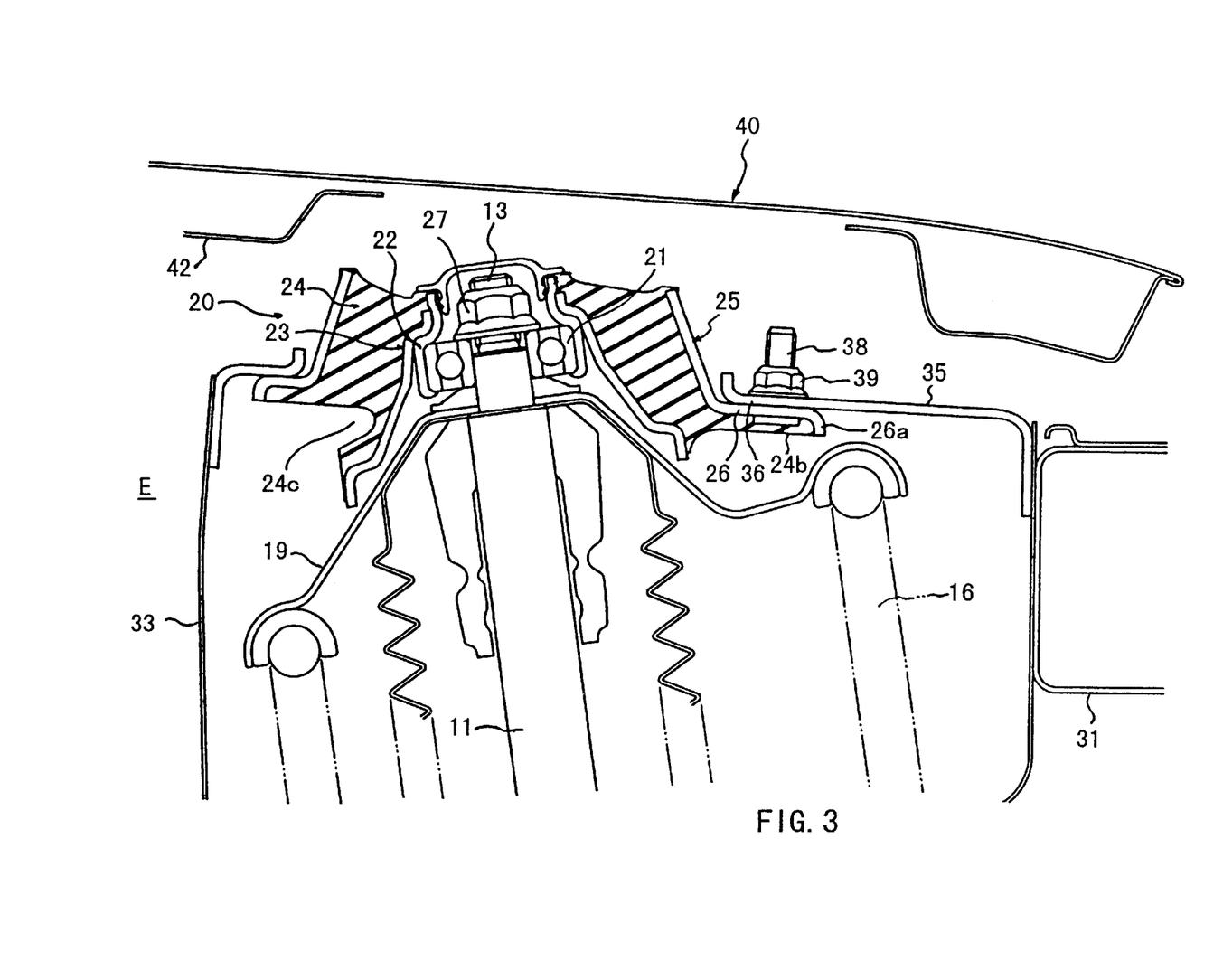
FIG. 3 is the essential part cross-section of the strut mount structure of a second modification of the first embodiment.

In the above explanation, the bottom edge 24b of the rubber portion 24 has the inner-lower periphery located by the lower edge of the flange 23c, and the outer-lower periphery located by the flange 26. In addition, the rubber portion 24 has the concave part 24c which is slant opened to the bottom edge 24b. However, it is possible to prepare the rubber portion 24 with a differently shaped concave part. For instance, the outer-lower periphery of the bottom edge 24b can be extended to the tip of a secondary flange 26a as shown in FIG. 3. The rubber portion 24 with the concave part 24c in FIG. 3 can be easily produced by use of a lower part of a mold for vulcanization composed of a plurality of sections divided in the radial direction. Each section can be detached horizontally in the outer direction.

(Second Embodiment)

A second embodiment of the strut mount structure according to the present invention will now be explained by referring to FIG. 4 as a cross-section of an essential part. Detailed explanation on some members shown in FIG. 4 is omitted by using the same reference numerals as the corresponding members in FIGS. 1 to 3, and members or parts different therefrom are to be mainly explained.

Figure 4:
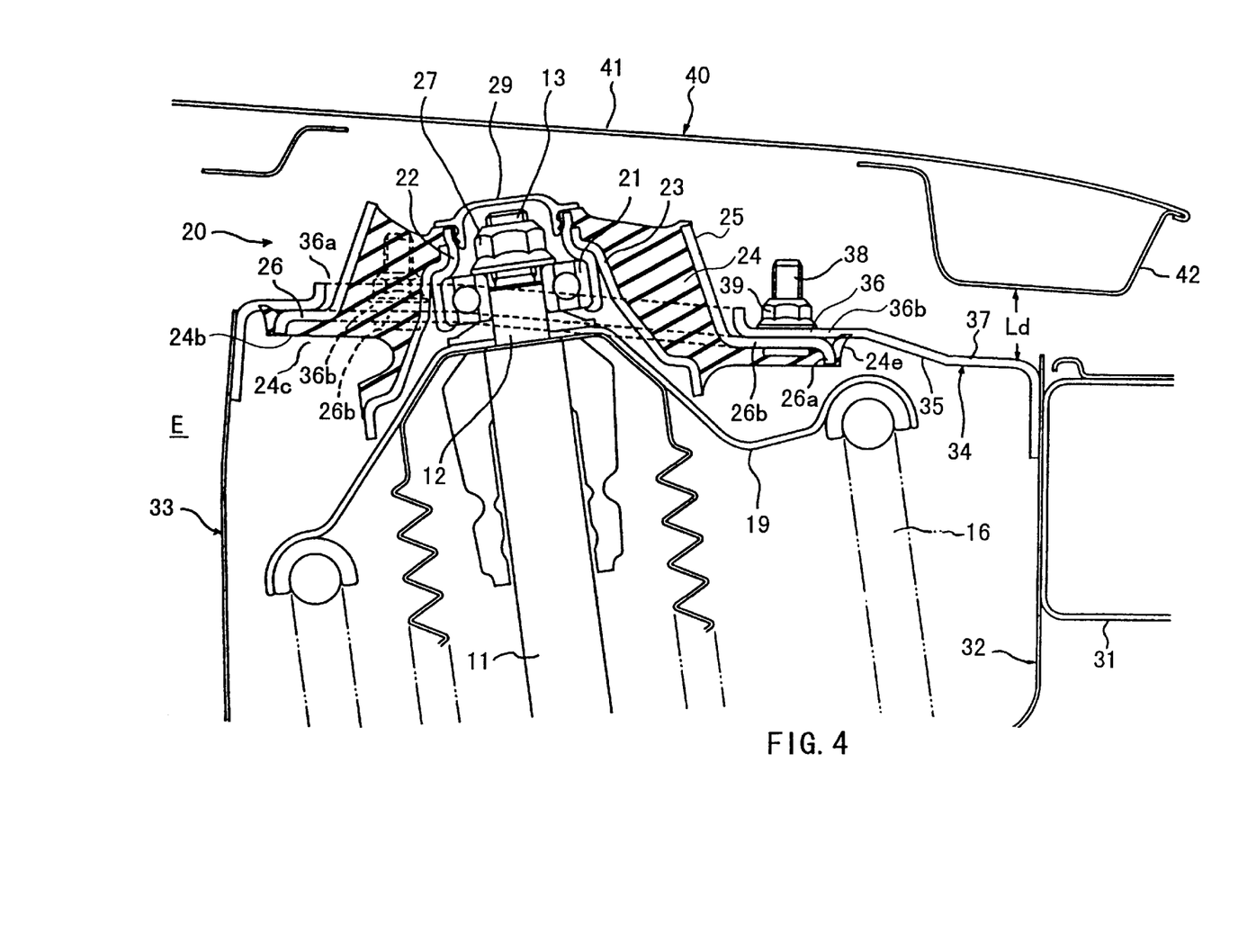
FIG. 4 is the essential part cross-section of the strut mount structure for explaining the strut mount structure as an example of a second embodiment according to the present invention.

In FIG. 4, a strut 11 which has the same structure as that shown in FIG. 1 is provided with a strut inclination angle and a caster angle for obtaining steering stability, and the top end of the strut 11 is fixed to and supported by the upper bracket 34 by a strut mount unit 20.

On a strut mount installation portion 36, i.e., on a planer part 35 of the upper bracket 34, three bolt hole formation portions 36b (only two of them are shown) are formed each on a horizontal plane having equal intervals therebetween along the outer periphery of a strut installation hole 36a. The bolt hole formation portions 36b are circumferential parts around bolt holes (not shown) to which bolts 38 are inserted for fixation of the outer fitting 25. The strut mount installation portion 36 is made of a plurality of planar parts connected to each other with the horizontally prepared bolt hole formation portions 36a between each two of the planar parts. Therefore, it is possible to vertically fix the bolts 38. There is also provided a low part 37 as a step down from the strut mount installation portion 36 on the planer part 35. In this embodiment, a gap Ld between the low part 37 and the front hood 40 is satisfactory maintained.

Bolt installation portions 26b corresponding to flange 26 of the outer fitting 25 and the bolt hole formation portions 36b are each in the form of a horizontal plane. On the other hand, the strut mount unit 20 is fixed to the strut mount installation portion 36 of the upper bracket 34 by being inserted from the bottom. Thus, the flange 26 is in contact with the strut mount unit 20 over the surface, thereby being maintained in a stable condition. A bolt 38 is vertically applied to each of the bolt installation portion 26b.

A secondary flange 26a which is further formed around the flange 26 is covered with the extended bottom edge 24b of the rubber portion 24. Furthermore, there is formed a sealing portion 24e united to the rubber portion 24. The sealing portion 24e is formed by extending the bottom edge 24b to the lower surface of the upper bracket 34.

The strut mount unit 20 attached to the top of the strut 11 is inserted to the strut installation hole 36a from the bottom. The flange 26 is brought into contact with the lower face of the strut mount installation portion 36 with the bolts 38 fixed to the lower face of the flange 26. The bolt is penetrated to the bolt hole. Then, the nuts 39 are screwed onto the bolts 38 protruded from the bolt hole. Thus, the strut mount unit 20 is fixed to the upper bracket 34.

In the second embodiment, the bolt hole formation portions 36b on the upper bracket 34 are horizontally provided. Since automatic installation of strut mount structures by a nut runner is successfully performed on bolts vertically provided on horizontal surfaces, it is possible to easily perform an automatic installing operation of the strut mount structure of the present invention.

Moreover, the sealing portion 24e of the rubber portion 24 seals a gap between the outer periphery of the flange 26 and the lower face of the upper bracket 34. By the provision of the sealing portion 24e, it is possible to effectively prevent entrance of water drops, muddy water scattered by wheels to an engine room E and adherence such as water drops, whereby a rust prevention effect can be obtained.

Furthermore, it is possible to positively obtain a large gap between the low part 37 and the front hood 40 by forming the low part 37 on the planer part 35. In this case, the shape of the front hood 40 can be freely selected and the structural design freedom is increased. The large gap makes it possible to sufficiently absorb externally applied impact, whereby safety to pedestrians is increased.

Furthermore, it is also possible, in the first embodiment of the present invention, to prepare a low part 37 on the upper bracket for obtaining a large gap between the downwardly protruded part of the inner panel 42 and the lower part 37. In addition, it is possible to provide the sealing portion 24e on the rubber portion 24 in the strut mount structure of the first embodiment, to seal a gap between the outer periphery of the flange 26 and the lower face of the upper bracket 34.

Other structures and functions that may be disclosed in Japanese Patent Application 2000-310980, filed on Oct. 11, 2001 are hereby incorporated by reference into this application.

The invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A strut mount structure for supporting a strut installed in a strut tower in a vehicle body, comprising:
   an upper bracket provided on a top of the strut tower, said upper bracket having a strut installation hole and a strut mount installation portion provided to surround said strut installation hole; and
   a strut mount unit having an inner fitting approximately in a cylinder shape with an inner fitting top edge, said inner fitting supporting a top end of the strut; an outer fitting approximately in a cylinder shape with an outer fitting top edge, and a flange connected to said strut mount installation portion with a top part of said outer fitting inserted into said strut installation hole from the bottom of said upper bracket; a rubber portion with a rubber top face, interposed between said inner fitting and said outer fitting for connecting said inner fitting and said outer fitting together, wherein an imaginary plane defined on said outer fitting top edge and a central axis of the strut cross each other so as to define a first angle as an inner angle when viewed from the front of the vehicle body and a second angle as a front angle when viewed from the side of the vehicle body, said first angle being an obtuse angle and said second angle being an acute angle.

2. The strut mount structure as claimed in claim 1, wherein said inner fitting top edge, said outer fitting top edge and said rubber top face approximately form a single planar upper face of said strut mount unit.

3. The strut mount structure as claimed in claim 1, wherein said flange further comprises an installation bolt which has been fixed thereto at a bolt installation portion, said strut installation portion further comprises a bolt hole perforated therein, said installation bolt inserted into said bolt hole from the bottom of said strut installation portion, a part of said bolt upwardly protruded from said bolt hole being connected with a nut so that said outer fitting is connected to said upper bracket, each of said bolt installation portion and a bolt hole formation portion of said strut installation portion is horizontal, and said installation bolt extends in a vertical direction.

4. The strut mount structure as claimed in claim 1, wherein said rubber portion comprises a sealing portion which seals a gap between an outer periphery of said flange and a lower face of the upper bracket.

5. A strut mount structure for supporting a strut installed in a strut tower in a vehicle body, comprising:
   an upper bracket provided on a top of the strut tower, said upper bracket having a strut installation hole and a strut mount installation portion provided to surround said strut installation hole; and
   a strut mount unit having an inner fitting approximately in a cylinder shape with an inner fitting top edge, said inner fitting supporting a top end of the strut; an outer fitting approximately in a cylinder shape with an outer fitting top edge, and a flange connected to said strut mount installation portion by an installation bolt with a top portion of said outer fitting being inserted into said strut installation hole from the bottom of said upper bracket; a rubber portion with a rubber top face, interposed between said inner fitting and said outer fitting for connecting said inner fitting and said outer fitting together, wherein said outer fitting is fixed to said strut mount installation portion so as to maintain an almost equal distance from any portion of said outer fitting top edge to a lower face of a front hood of the vehicle body so as to maintain a top of the installation bolt at a position lower than said outer fitting top edge.

6. The strut mount structure as claimed in claim 5, wherein said inner fitting top edge, said outer fitting top edge and said rubber top face approximately form a single planar upper face of said strut mount unit.

7. The strut mount structure as claimed in claim 5, wherein said flange further comprises said installation bolt fixed thereto at a bolt installation portion, said strut installation portion further comprises a bolt hole perforated therein, said installation bolt inserted into said bolt hole from the bottom of said strut installation portion, a portion of said bolt upwardly protruded from said bolt hole being connected with a nut so that said outer fitting is connected to said upper bracket, each of said bolt installation portion and a bolt hole formation portion of said strut installation portion is horizontal, and said installation bolt extends in a vertical direction.

8. The strut mount structure as claimed in claim 5, wherein said rubber portion comprises a sealing portion which seals a gap between an outer periphery of said flange and a lower face of the upper bracket.

9. The strut mount structure as claimed in claim 8, wherein said inner fitting top edge, said outer fitting top edge and said rubber top face approximately form a single planar upper face of said strut mount unit.

10. The strut mount structure as claimed in claim 8, wherein said flange further comprises said installation bolt fixed thereto at a bolt installation portion, said strut installation portion further comprises a bolt hole perforated therein, said installation bolt inserted into said bolt hole from a bottom of said strut installation portion, a portion of said bolt upwardly protruded from said bolt hole being connected with a nut so that said outer fitting is connected to said upper bracket, each of said bolt installation portion and a bolt hole formation portion of said strut installation portion is horizontal, and said installation bolt extends in a vertical direction.

11. A strut mount structure for supporting a strut installed in a strut tower in a vehicle body, comprising:
   an upper bracket provided on a top of the strut tower, said upper bracket having a strut installation hole and a strut mount installation portion provided to surround said strut installation hole; and
   a strut mount unit having an inner fitting approximately in a cylinder shape with an inner fitting top edge, said inner fitting supporting a top end of the strut; an outer fitting approximately in a cylinder shape with an outer fitting top edge, and a flange connected to said strut mount installation portion with a top portion of said outer fitting being inserted into said strut installation hole from a bottom of said upper bracket; a rubber portion with a rubber top face, interposed between said inner fitting and said outer fitting for connecting said inner fitting and said outer fitting together, wherein said outer fitting top edge is inclined to have an outer side lower than an inner side in a widthwise direction of the vehicle body and a front side lower than a rear side in a front to back direction of the vehicle body.

12. The strut mount structure as claimed in claim 11, wherein said inner fitting top edge, said outer fitting top edge and said rubber top face approximately form a single planar upper face of said strut mount unit.

13. The strut mount structure as claimed in claim 11, wherein said flange further comprises an installation bolt fixed thereto at a bolt installation portion, said strut installation portion further comprises a bolt hole perforated therein, said installation bolt inserted into said bolt hole from a bottom of said strut installation portion, a portion of said bolt upwardly protruded from said bolt hole being connected with a nut so that said outer fitting is connected to said upper bracket, each of said bolt installation portion and a bolt hole formation portion of said strut installation portion is horizontal, and said installation bolt extends in a vertical direction.

14. The strut mount structure as claimed in claim 11, wherein said rubber portion comprises a sealing portion which seals a gap between an outer periphery of said flange and a lower face of the upper bracket.

* * * * *